United States Patent [19]

Soloy

[11] Patent Number: 4,531,694
[45] Date of Patent: Jul. 30, 1985

[54] TURBINE ENGINE DRIVE AND MOUNTING ASSEMBLY FOR FIXED WING AIRCRAFT

[75] Inventor: Joe I. Soloy, Centralia, Wash.

[73] Assignee: Soloy Conversions, Ltd., Olympia, Wash.

[21] Appl. No.: 435,094

[22] Filed: Oct. 18, 1982

[51] Int. Cl.³ .............................................. B64D 27/10
[52] U.S. Cl. ...................................... 244/54; 248/554
[58] Field of Search ......................... 244/54, 53 R, 60; 248/554–557; 464/92; 60/39.3–39.32

[56] References Cited

U.S. PATENT DOCUMENTS

| | | | |
|---|---|---|---|
| 1,584,053 | 5/1926 | Wait, Jr. ................................. | 244/54 |
| 2,220,514 | 11/1940 | D'Aubarede ......................... | 244/54 |
| 2,539,960 | 1/1951 | Marchant et al. .................... | 244/54 |
| 2,632,997 | 3/1953 | Howard et al. ..................... | 60/39.3 |
| 2,712,741 | 7/1955 | Roller ................................... | 464/92 |
| 2,715,508 | 8/1955 | Small, Jr. .............................. | 244/54 |
| 3,020,004 | 2/1962 | Blyth et al. ........................... | 244/54 |
| 3,360,222 | 12/1967 | West, Jr. ............................... | 244/54 |
| 3,907,220 | 9/1975 | Amellio ................................ | 248/557 |
| 3,979,087 | 9/1976 | Boris et al. ........................... | 244/54 |

FOREIGN PATENT DOCUMENTS

| | | | |
|---|---|---|---|
| 449142 | 6/1948 | Canada ................................. | 248/554 |
| 48607 | 4/1938 | France ................................. | 248/557 |
| WO82/20695 | 8/1982 | PCT Int'l. Appl. . | |
| 814049 | 5/1959 | United Kingdom ................. | 248/557 |

OTHER PUBLICATIONS

Descriptive Material: Figure 22.1 Allison Model 501-D13 turboprop engine (Allison Div. General Motors), p. 443.

Advertising Brochure: Soloy Turbine Conversions, by Soloy Conversions, Ltd.
News Articles: Rotor & Wing, 12/78, pp. 28-30, 35-36, On The Deck 12/80, p. 26.
News Releases by Soloy Conversions, Ltd.: Soloy to Introduce Turbine Conversions for the Pawnee Brave and Cessna 188, at NAAA '80; 10/15/80, 4.8 Million International Sales; 6/19/81.
Soloy Names New Japan Distributor; 9/3/81; Advertisements: Flyer Mail-Out, by Soloy Conversions, Ltd., 12/80.
Annual Report: Soloy Conversions, Ltd. Annual Report Mailed to Shareholders, 11/80, p. 3.

Primary Examiner—Galen L. Barefoot
Attorney, Agent, or Firm—Klarquist, Sparkman, Campbell, Leigh & Whinston

[57] ABSTRACT

A turbine engine drive and mounting assembly for a propeller-driven, fixed-wing aircraft includes an open support frame resiliently mounted to and cantilevered from an air frame portion of the aircraft. A gearbox is rigidly mounted to the free end of the open support frame and is adapted for mounting and driving a propeller. A turbine engine is positioned within the support frame in spaced relation to the gearbox. The turbine engine is suspended from a ring member of the support frame so as to enable expansion and contraction of the engine relative to the support frame and pivoting of the engine on the ring member for maintenance. The engine is drivingly connected to the gearbox through flexible couplings. High torque loads at the gearbox are transmitted through the support frame directly to the air frame, bypassing the engine.

6 Claims, 11 Drawing Figures

TURBINE ENGINE DRIVE AND MOUNTING ASSEMBLY FOR FIXED WING AIRCRAFT

BACKGROUND OF THE INVETION

The present invention relates to propeller-driven fixed-wing aircraft and especially to a turbine engine drive and mounting assembly for use as either original equipment or as a conversion unit for such aircraft.

Single or twin-engine propeller-driven airplanes typically use piston engines as their prime movers. However, for many heavy-use military, agricultural, forestry, mining and other industrial applications, and for use in climate and altitude extremes and in rugged terrain with short runways, turbine engines offer significant advantages over piston engines for driving such aircraft. Turbine engines are much lighter weight than piston engines of the same horsepower. Therefore a turbine powered aircraft would have greater altitude, would require shorter takeoffs and landings, and would achieve its cruising or working altitude quicker than a comparable piston engine-powered airplane. A turbine engine is also more dependable than a piston engine, especially in very cold climates, and is easier to operate and control. It also can be operated for longer periods between overhauls and usually requires much less maintenance between overhauls than a piston engine, thereby compensating for its higher initial cost and cost of overhaul. In many cases turbine fuel is less expensive than the sometimes scarce aviation gasoline used in aircraft piston engines. Nevertheless, suitable turboprop gas turbine engines are not available in the configurations required for aircraft used in dirty environments and climate extremes. Therefore, fixed-wing aircraft used for such purposes continue to be driven by piston engines.

Reliable turboshaft gas turbine engines are available in the horsepower ranges reguired for propeller-driven aircraft. However, their typically high r.p.m. outputs make them unsuitable for use with aircraft unless coupled to a reduction gearbox to reduce speed to the levels required for driving a propeller. In fact, turboshaft engines coupled with gearboxes are used for driving helicopters (rotary wing aircraft) and are used in large, heavy fixed-wing planes.

In prior fixed-wing applications the turboshaft engine and gearbox have been rigidly interconnected, either by mounting the gearbox directly to the engine housing, or by suspending it rigidly from the engine housing. However, both such arrangements are undesirable for airplanes, especially light aircraft, because the high torque developed by the gearbox is transmitted directly to the engine, shortening its life and requiring unacceptably frequent major and expensive overhauls. Direct coupling of the gearbox and turboshaft engine would be especially unacceptable for light airplanes used in hostile environments where propeller strikes are a hazard, often overturning the airplane. Any shock loading or unbalanced torque loading caused by a propeller strike would be transmitted directly through the gearbox to the engine, causing severe damage and necessitating expensive repairs. Thus, with a turbine engine, which may be up to six times as expensive as a comparable piston engine, engine damage is to be avoided at all cost.

Turboshaft engines have been readily adapted for use in helicopters using gearboxes mounted entirely independently of the engines on separate mounting frames, thereby effectively isolating the engine from the high torque loads at the gearbox. However, in airplanes there are constraints of space, shape and position which do not permit independent mounting of the gearbox and engine on separate mounting frames in the same manner as helicopters.

Sand, dirt, dust, and other foreign objects are other hazards of a hostile environment which have heretofore made turboshaft engines impractical for use in light airplanes used in such environments. The compressor blades of a turboshaft engine typically rotate at up to 54,000 r.p.m., and therefore foreign objects in the huge quantities of air sucked in by the air compressors of such engines can rapidly and seriously damage such compressors. Complicating the problem is the fact that the air intakes and compressors of turboshaft engines suitable for aircraft use typically face forward toward the propeller where their exposure to foreign objects would be the greatest.

Accordingly, there is a need for a method and a means for mounting a turboshaft engine and associated drive train in fixed-wing aircraft in a manner that would protect the turbine engine from the normal high torque loads at the gearbox, the excessive torque and shock loads of a propeller strike, and foreign object damage.

A primary objective of the invention is, therefore, to provide an acceptable method and means for driving the propeller of a fixed-wing aircraft with a turboshaft engine. Another primary object is to provide a method and means as aforesaid which isolates the engine from the normal high torque loads of the gearbox and propeller-induced shock loads.

Another important object is to provide a method and means as aforesaid which protects the turbine engine from foreign object damage.

Another important object is to provide a method and means as aforesaid which also provides easy access to the engine and other drive train components for service and maintenance.

Another object is to provide a method and means as aforesaid which enables quick and inexpensive conversion of fixed-wing aircraft from a piston engine drive to a turbine engine drive.

Still another object is to provide a method and means as aforesaid which protects the engine from damage in the event of a propeller strike or an overturned aircraft.

Further objects are to provide a unitary turboshaft engine mounting and drive assembly for airplanes which is adaptable for different sizes, makes and models of such aircraft, and which can be installed in such aircraft either as original equipment or as a retrofit conversion.

Another object is to provide a turboshaft engine mounting and drive assembly for aircraft which enables the engine to provide reliable performance with low maintenance and long periods between overhauls, even when used in hostile environments.

SUMMARY OF THE INVENTION

In accordance with the invention, the foregoing objects are met by mounting a gearbox to the free end of an open support frame cantilevered from the air frame of the aircraft, and mounting a turboshaft engine independently of the gearbox in a free-floating manner to the support frame so that high torque loads from the gearbox are transmitted through the support frame directly to the air frame without passing through the engine.

The support frame may include a ring member connected to the air frame and longitudinal frame members extending from the ring member to the gearbox. According to one embodiment, the engine mounting means may include pin-type mounts connecting the engine to the ring member in a manner which enables the engine to expand and contract relative to the ring member. Two such engine mounts on opposite sides of the engine may be pivot mounts so that the engine can be pivoted up on the support frame for servicing without removing it from the frame. Some of the longitudinal frame members may be removable to facilitate pivoting of and access to the engine.

A driveline extends from an output shaft of the engine to an aligned input shaft of the gearbox, and the driveline may be flexibly coupled to such output and input shafts to provide for limited angular deflection between the shafts.

The engine may be positioned so that its air inlet and compressor face rearwardly of the aircraft, thus shielding them from direct exposure to dust, dirt, and other foreign objects.

According to a second embodiment, the means mounting the engine to the ring member may include adjustable-length support rods cantilever-mounting the engine from the ring member to provide for precise alignment between the engine output shaft and gearbox input shaft and thereby reduce or eliminate the need to flexibly couple such shafts. The engine may also be cantilever mounted by such support rods on the opposite side of the ring member from the gearbox, thereby shortening the cantilever-mounting of the gearbox, and more evenly balancing the engine and gearbox loading of the ring member and its connections to the air frame.

The foregoing objects, features and advantages of the present invention will become more apparent from the following detailed description which proceeds with reference to the accompanying drawings.

DETAILED DESCRIPTION OF PREFERRED EMBODIMENTS

Figure 1:
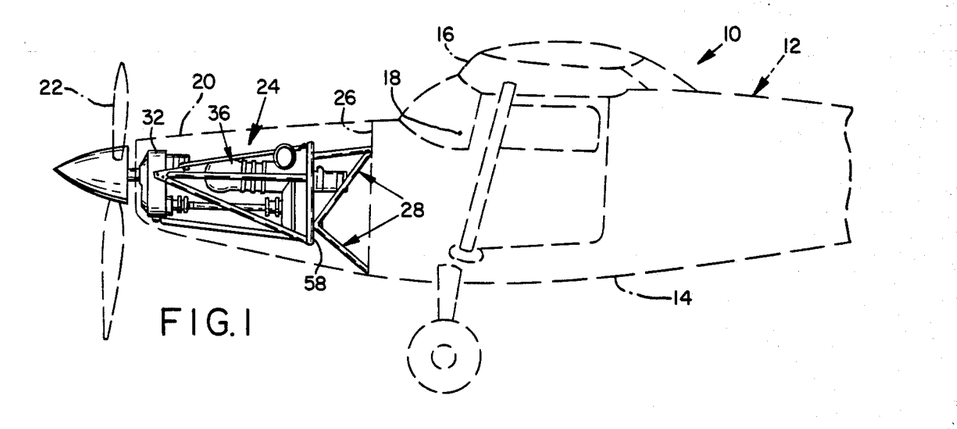
FIG. 1 is a partial side elevational view showing in phantom lines a single-engine, fixed-wing aircraft with a turbine mounting and drive assembly of the invention shown in full lines installed in the nose of the aircraft.

FIG. 1 Embodiment

Referring to FIG. 1, an airplane 10 includes an air frame 12 having a fuselage portion 14 supporting a fixed overhead wing 16 over a cabin 18 rearwardly of a nose portion 20. The illustrated airplane is a typical single-engine airplane with a single propeller 22 mounted at the forward end of the nose of the fuselage. The turbine engine mounting and drive assembly, indicated generally at 24, is mounted in the nose 20 forwardly of a fire wall 26 of the fuselage by conventional tubular air frame members 28.

Figure 2:
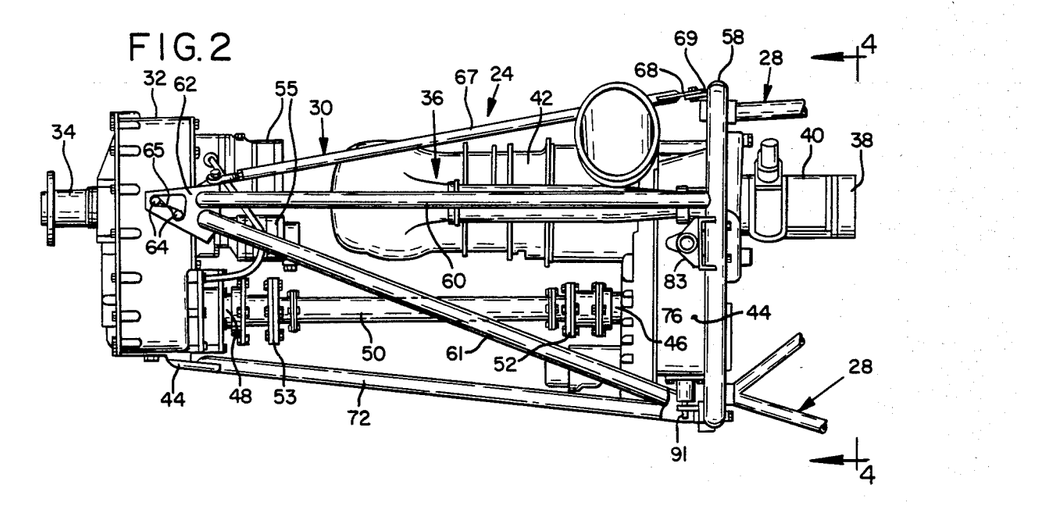
FIG. 2 is an enlarged side elevational view of the mounting and drive assembly of FIG. 1.
Figure 3:
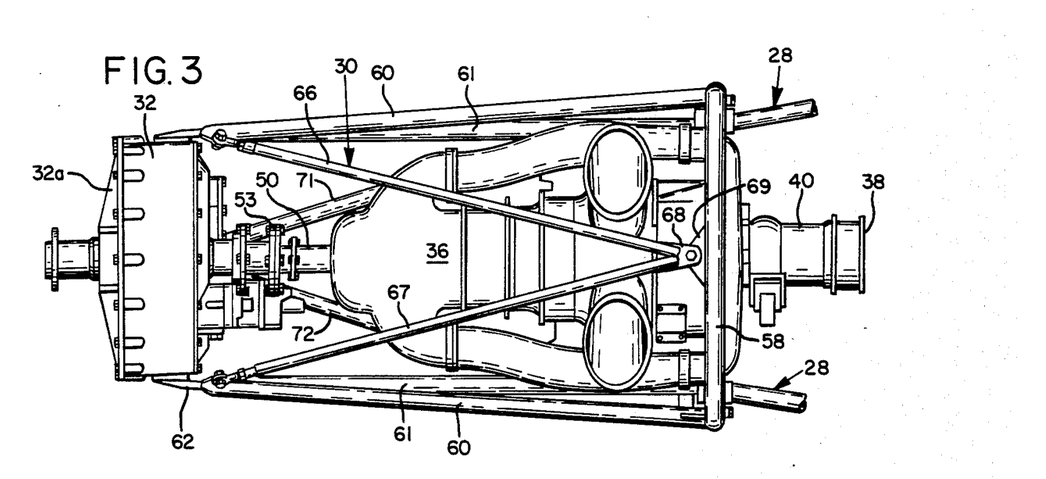
FIG. 3 is a top plan view of a mounting and drive assembly of FIG. 2.
Figures 4, 5, 6, 7, 8:
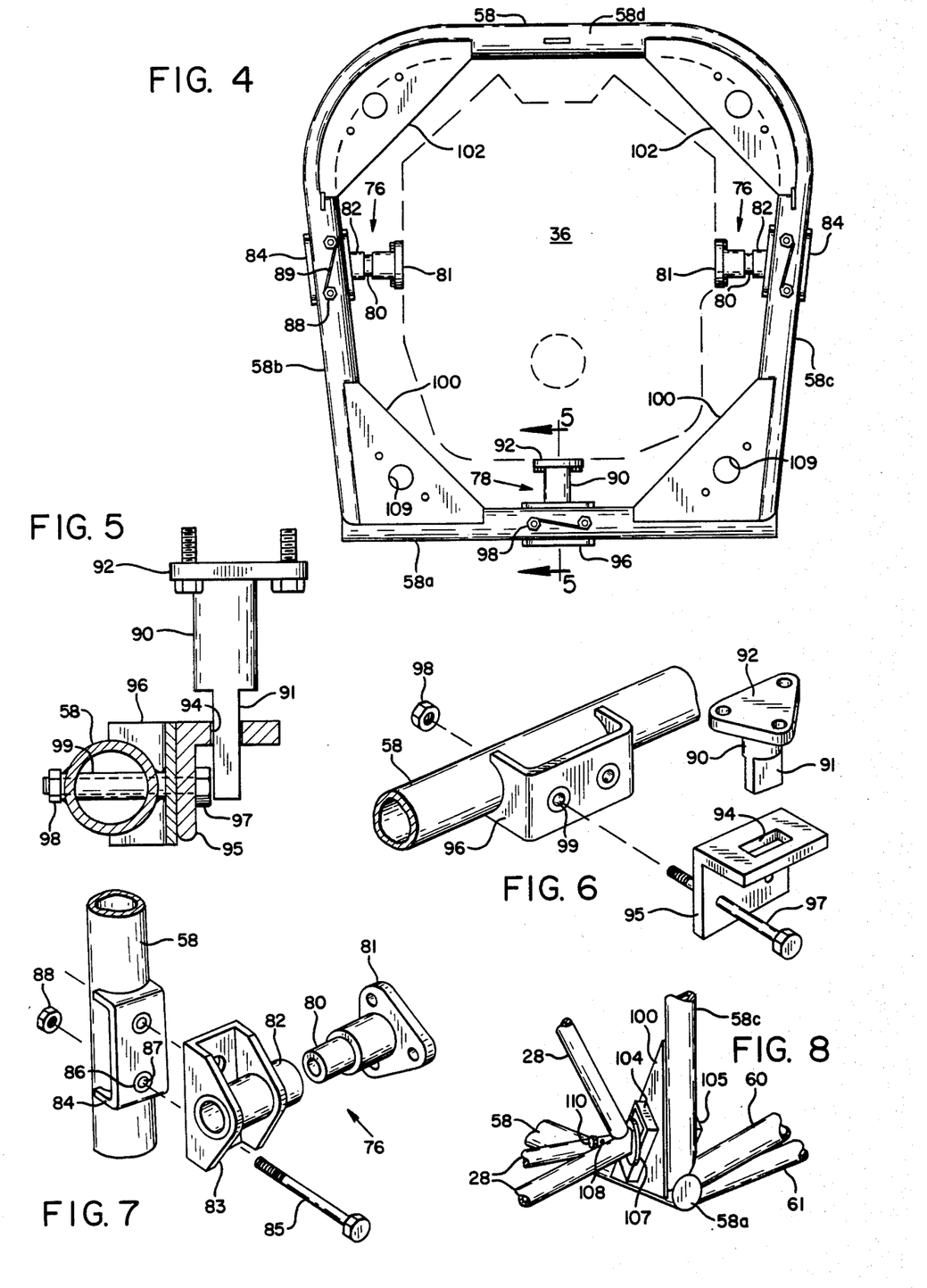
FIG. 4 is a vertical sectional view, looking forward, taken along line 4—4 of FIG. 2.
FIG. 5 is a vertical sectional view, on an enlarged scale, taken along line 5—5 of FIG. 4.
FIG. 6 is an exploded perspective view of the bottom engine mount portion of the assembly shown in FIG. 5.
FIG. 7 is an exploded perspective view of one of the side engine mounts of the assembly.
FIG. 8 is a perspective view showing a typical one of four connections of the assembly to the air frame.

Referring now to FIGS. 2, 3 and 4, the turbine engine mounting and drive assembly is shown in greater detail. In general, such assembly includes an open support frame 30 mounted at one end to air frame members 28, which in turn connect the support frame to fire wall 26. The opposite, free end of the support frame terminates at a gearbox 32 having an output or propeller shaft 34 for mounting propeller 22. The support frame 30 is a cage-like open tubular framework which defines an interior space for housing a turboshaft gas turbine engine 36.

Typically, the turboshaft engine 36 suitable for light, fixed-wing aircraft with which the present invention is concerned will be in the 400–700 horsepower class, although such engines could be smaller or larger depending on application and availability. Such engine typically includes an air inlet 38 to a nine-stage air compressor 40, designed to turn at up to 54,000 r.p.m. To minimize damage from the intake of dust, dirt, sand and other foreign objects, the air inlet preferably is directed aft of the aircraft, while the turbine unit 42 extends forwardly toward the propeller. The turbine engine's integral gear case 44 depends from rear of the turbine unit and has an output shaft 46 extending forwardly from the gear case toward the large reduction gearbox 32. The output speed of such shaft is typically about 6,000 r.p.m. or higher. If desired, a particle separator (not shown) can be attached to the air intake and is recommended if the aircraft is to be used in exceptionally dirty environments.

Output shaft 46 is coupled to an axially aligned input shaft 48 of gearbox 32 by a drive shaft 50. A first diaphragm-type flexible coupling 52 connects output shaft 46 to drive shaft 50, and a second similar flexible coupling 53 connects the drive shaft to input shaft 48. These flexible couplings are designed to allow for slight misalignment and deflection between the output and input shafts which might occur, particularly during high power maneuvers. A suitable diaphragm-type coupling for a prototype of the invention was manufactured by Zurn Industries, Mechanical Drive Division of Erie, Pa. Such flexible couplings were designed to permit two-thirds of a degree of angular deflection each. The support frame and assembly were designed so that each coupling should experience no more than one-third of a degree of angular deflection under normal torque loading, thereby providing a 100% safety factor at each coupling.

Gearbox 32, although designed especially for the mounting and drive assembly of the invention, is of conventional internal construction, providing a single stage reduction from the input shaft 48 to the propeller shaft 34 through a single helically cut spur gear driving a ring gear to provide an output speed of approximately 1800 r.p.m. at the propeller shaft. This provides a relatively lower propeller speed and higher output torque than a comparable piston engine drive, resulting in a quieter operation.

Gearbox 32 may be provided with accessory drive takeoffs for driving accessories such as the pumps 55 shown. The gearbox preferably incorporates pressure oiling to all main bearings and utilization of turbine oil as the gearbox lubricant to permit cold weather starting at temperatures down to at least −25° F. All of the gearbox's gears, including those for the accessory drives, are preferably supported in bearings on both sides (straddle-mounted) to provide for long life and easy overhaul.

Gearbox 32 is rigidly mounted to the forward or free end of support frame 30, and thus, in effect, becomes a part of such support frame. The opposite end of the support frame is formed by a tubular ring member 58, the configuration of which is shown best in FIG. 4. Longitudinal tubular frame members extend forwardly from the ring member 58 and include a pair of side frame members 60,61 at each side of the frame terminating at their forward ends at a connecting plate 62, which in turn is rigidly connected to gearbox 32 by a pair of threaded fasteners 64, secured by a lock wire 65. Side frame members 60,61 are rigidly affixed to ring member 58 as by welding. The longitudinal frame members also include a pair of wishbone-shaped top frame members 66,67, which diverge from a connecting plate 68 bolted to a top ear 69 of ring member 58. The divergent forward ends of the top frame members are bolted to connecting plates 62. The longitudinal frame members also include a pair of tubular bottom frame members 71,72, shown best in FIG. 3, which diverge rearwardly from a common connector plate 74 fastened to the bottom of gearbox 32 and terminate at the opposite lower corners of ring member 58, to which they are welded.

From the foregoing it will be seen that the ring member 58, longitudinal frame members and gearbox 32 form a rigid, cage-like support structure which will transmit high torque loads from the propeller and gearbox directly to ring member 58 and connected air frame members 28. It will also be seen that such support structure forms a protective enclosure for turbine engine 42. Thus, if the airplane should flip upside down, as sometimes happens in the case of a propeller strike or other factors encountered in hostile environments, the gearbox, support frame, and top of the aircraft will support the engine above ground level so that it should not be damaged.

Another important feature of the invention is the means by which the turbine engine 36 is suspended within and from the support frame 50 so that high torque loads developed at gearbox 32 bypass the engine when transmitted through support frame 30 to the air frame, thereby isolating the engine from such loads. Protecting the turbine engine from damage is a most important objective because of its high initial cost and cost of repair. Such engine represents by far the most expensive part of the aircraft's drive train. Thus protected, it should provide reliable, trouble-free operation with minimal service and maintenance over a far greater range of altitudes, temperatures and other environmental conditions than a comparable turbo-prop engine.

The means for mounting the engine within the support frame includes a pair of first and second pivot mounts 76, one at each of the opposite sides of the engine ring member 58, as best shown in FIG. 4. A third pin-and-slot-type engine mount 78 mounts the bottom of the engine to the bottom of the ring member 58. These three mounts are such that they allow for horizontal and vertical expansion and contraction of the engine relative to the supporting ring member due to changes in engine temperature.

Referring to FIG. 7, one of the two side pivot mounts 76 for the engine is shown in greater detail. FIG. 7 is typical of both such mounts. Such mount includes a pivot shaft 80 secured to a mounting pad 81, which in turn is fastened to the engine by threaded fasteners. Shaft 80 is received within a pivot tube 82 extending through and affixed to a channel member 83. Channel member 83 is in turn bolted through a mounting bracket 84 welded to the side of ring member 58 by a pair of bolts 85. These bolts extend through bushings 86 which line aligned openings 87 extending through bracket 84 and ring member 58, and are secured by nuts 88 and a lock wire 89 (FIG. 4).

The two pivot mounts 76 at opposite sides of the engine define a horizontal transverse pivot axis about which the engine can be tipped up for service as explained in greater detail hereinafter. The length of reduced pivot shaft portion 80 of each pivot mount 76 is also such that there is transverse "play" between the engine and ring member to allow for expansion and contraction of the engine with changes in engine temperature. The amount of such play will depend upon the expansion characteristics of the engine, but in a prototype assembly using an Allison 250-C20B engine, each pivot mount allowed for about 15 thousandths of an inch of expansion.

Referring to FIGS. 5 and 6, the bottom engine mount 78 is shown in greater detail. Such mount includes a shaft 90 having a flattened lower end 91 and carried by a mounting pad 92 secured by threaded fasteners to the bottom of engine 36. The lower end 91 of the shaft is received within a slot 94 of an angle bracket 95, which in turn is bolted through a mounting bracket 96 welded to ring member 58 by bolts 97 and nuts 98. Bottom mounting bracket 96 may be identical to side mounting brackets 84. Similarly, bushings 99, which extend within openings through the mounting bracket 96 and the bottom of ring member 58, may be identical to the bushings 86 extending through the similar openings of the side mounting brackets 84 and ring member. Each such bushing, as best shown in FIG. 5, is welded to both ring member 58 and mounting bracket 96. The length and width of flattened shaft portion 91 in relation to slot 94 of the angle mount are such that expansion of the engine vertically due to changes in engine temperature is accommodated as well as some slight lateral movement of the engine on the side mounts 76. Of course, when it is desired to pivot engine 36 up on its side mounts 76, angle bracket 95 must be removed from bottom mounting bracket 96.

Because ring member 58 supports the entire weight of the engine, as well as the frame members, gearbox and propeller cantilevered from it, it must be strong and rugged. Although its shape may vary with different engine configurations, in FIG. 4 the ring member is shown having a generally "D" shape with a flat lower tubular member 58a and side tubular members 58b,58c diverging slightly outwardly and upwardly from the opposite ends of the lower tubular member 58a and then curving broadly at their upper portions to meet along a flat top portion 58d. A pair of generally triangular gusset plates 100 reinforce the lower corners of the ring member, and a pair of generally arcuate gusset plates 102 reinforce the curved upper corners of the ring member.

Ring member 58 is mounted directly, but resiliently, to air frame members 28. The detail of one of these resilient air frame mounts, shown in FIG. 8, is typical of such mounts at each of the four corners of the ring member. Each resilient mount includes a pair of resilient mounting pads 104,105, one on each of the opposite sides of a gusset plate 100. The air frame members 28 merge at an integral mounting disk connector 107. The connector includes a boss 108 through which an opening extends in alignment with a large opening 109 in the gusset plate. A bolt 110 extends through both the boss opening of disk connector 107, aligned openings in the resilient pads 104,105 and the large gusset opening 109, with the bolt being secured by a nut and washer assembly (not shown) at the outer face of pad 105.

With the foregoing mounting of the support frame to the air frame, high torque loads normally induced by the relatively slow turning propeller 22 are transmitted from the gearbox 32 directly through the longitudinal members of the support frame 30 to the ring member, and from there directly into the connected air frame members 28, bypassing the engine floatingly mounted within the support frame. The three pin-type mountings of the engine 36 to the ring member 58 allow for limited horizontal and vertical expansion and contraction of the engine relative to the support frame because of engine temperature changes. The same pin-type mountings, of course, permit slight lateral play of the engine relative to the ring member. The overall effect of the engine mounting is to isolate the engine from the high torque loads at the gearbox.

The described assembly also facilitates easy servicing of the engine and other drive train components and easy access to such components. For example, access to the turbine engine is gained quickly by removing the angle bracket 95 of bottom engine mount 78, removing the top longitudinal frame members 66,67 and uncoupling the engine's output shaft from the drive shaft 50 at flexible coupling 52, allowing the engine to be tipped up about the pivot axis of the side engine mounts 76. It will be appreciated that this procedure does not disturb the critical axial alignment between the engine's output shaft 46 and the input shaft 48 to gearbox 32. Similarly, the gearbox can be serviced in many cases without removing it from the support frame, simply by removing its face plate 32a. When necessary, the gearbox can be removed from the assembly simply by disconnecting it from its supporting longitudinal frame members and uncoupling it from drive shaft 50, again without disturbing the critical alignment between the engine output shaft and the gearbox input shaft.

The illustrated and described turbine engine mounting and drive assembly has been successfully installed, tested and certified for use in a Cessna Model 185 airplane, using an Allison Model 250-C20B 420 horsepower turboshaft gas turbine engine manufactured by Detroit Diesel. The gearbox was designed to handle up to 700 horsepower so as to accommodate an Allison Model 250-C30 turbine engine if desired. The output shaft 46 of the engine delivered power to the input shaft of the gearbox at approximately 6014 r.p.m., with the gearbox delivering high torque to the propeller shaft at approximately 1800 r.p.m. to turn a three-blade constant speed feathering propeller of 85 inch diameter.

It is contemplated that the exact arrangement and assembly shown will be modified to accommodate turbine engines of different manufacturers, sizes and configurations, and to accommodate different aircraft. In fact, it is contemplated that a slightly modified assembly will need to be designed and certified for each different model and make of aircraft. However, in all cases the operating principle of the assembly will be the same, namely, to isolate the engine from the gearbox so that high torque loads from the gearbox are transmitted through an engine support frame directly to the air frame, bypassing the engine.

In some applications, it may be possible to shorten drive shaft 50 to a point where there will be minimum deflection along the driving connection between the output shaft of the engine and the input shaft of the gearbox, thereby eliminating the need for flexible couplings 52,53. This might be done by mounting the gearbox closer to the engine. Such an arrangement is shown in FIGS. 9-11 with respect to a second embodiment of the invention.

Figures 9, 10, 11:
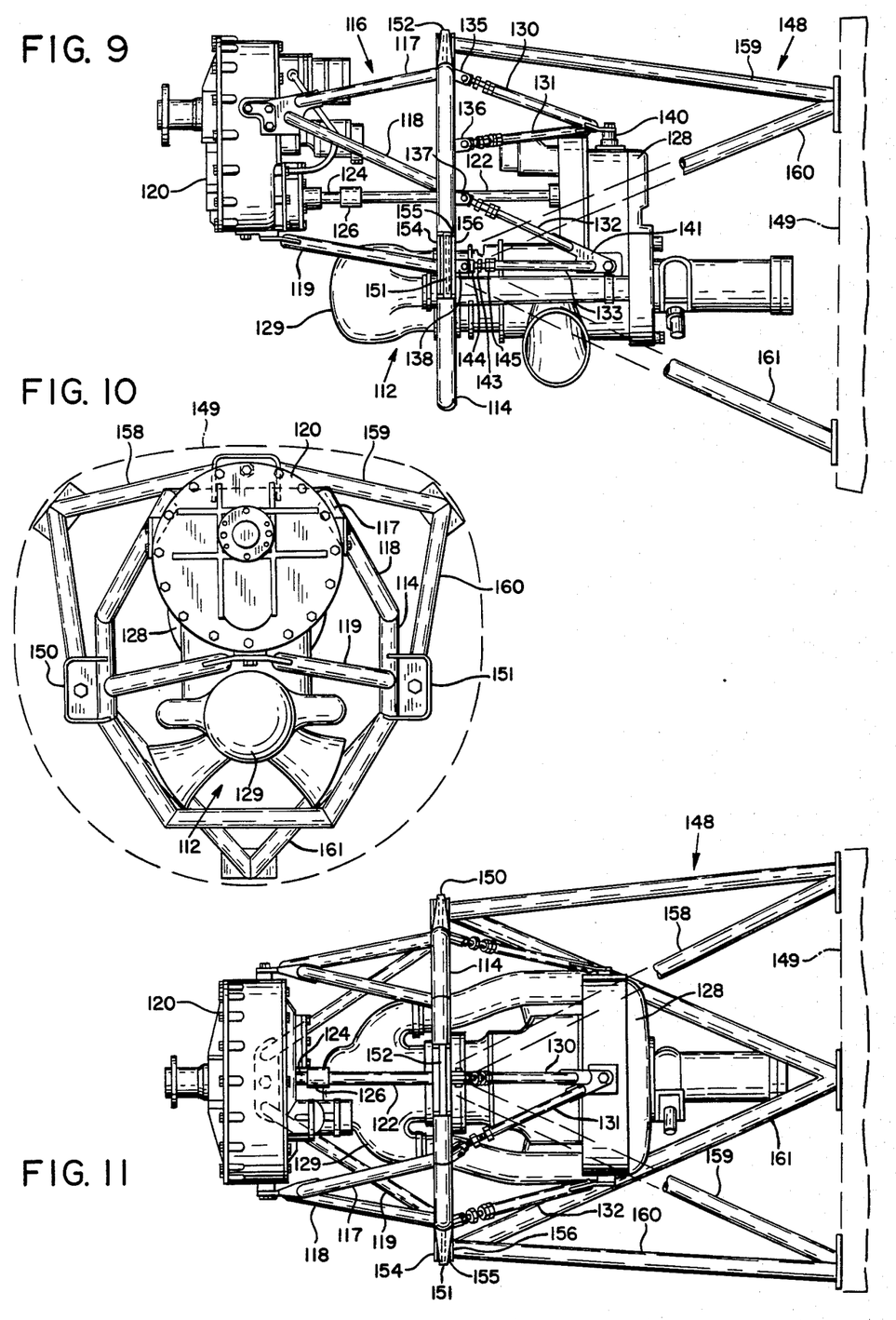
FIG. 9 is a side elevational view of a second embodiment of the invention.
FIG. 10 is a front view of the assembly of FIG. 9.
FIG. 11 is a top plan view of the assembly of FIG. 9.

In some applications it may also be possible to shorten the overall length of the support frame, thereby reducing its weight, by centering the engine within its mounting ring 58 as shown, for example, in FIG. 9.

It should also be appreciated that different truss configurations than that shown for the support frame may be used, depending on the configuration of the engine and gearbox. A second such configuration is shown in FIGS. 9-11.

The invention is also adaptable to twin-engine aircraft in which the turbine engines would be mounted to the wings or other portions of the air frame, rather than in the nose of the fuselage as shown. In such cases, the gearbox for each engine would still be cantilevered from the air frame at the end of a support frame, with the turbine engine suspended to the support frame independently of the gearbox.

The invention may also be adapted for use with a twin-engine, single-propeller drive in which two turboshaft engines, one mounted above the other, transmit power from their output shafts to a common gearbox having a single propeller shaft. With this arrangement, both engines would be suspended from the same ring member of a common support frame.

The invention is also adaptable for use in aircraft equipped with pusher-type propellers, rather than the puller-type as shown. In such cases the support frame would simply extend rearwardly from the air frame portion to which it is connected, rather than forwardly therefrom as shown.

FIG. 9 Embodiment

FIGS. 9-11 illustrate a second embodiment of the invention incorporating many of the features just mentioned. A turbine engine 112 similar to that of the previous embodiment is suspended from a ring member 114 of a support frame 116. The support frame includes longitudinal support frame members 117, 118, 119 extending forwardly from ring member 114 and rigidly mounting a gearbox 120 to their forward ends.

An output shaft 122 from engine 112 is coupled to the input shaft 124 of the gearbox at a rigid coupling 126. The rigid coupling is made possible by the fact that the distance between the gearcase 128 of the engine and the gearbox is much less in the embodiment of FIG. 9 than in the FIG. 1 embodiment. This in turn is made possible by the fact that engine 112 is turned upside-down in FIG. 9 as compared to the engine 36 in FIG. 1, thus enabling the gearbox 120 to be partially nested over the turbine housing 129 of engine 112.

Precise alignment of the engine output shaft with the gearbox input shaft is facilitated by the means mounting engine 112 from ring member 114. Such engine mounting means include a series of support rods 130-133 of adjustable length extending rearwardly from pivot connections 135-138 with ring member 114 to rigid connections 140,141 with a rear portion of engine 112. Each support rod 130-133 includes a turnbuckle portion 143 threaded at its opposite end portions into support rod sections 144,145 for adjusting the length of each support rod and thus the alignment between the engine and gearbox.

With the foregoing engine mounting arrangement, engine 112 is more nearly centered fore and aft within mounting ring 114 than in the FIG. 1 embodiment, and a greater portion of the engine projects rearwardly beyond the mounting ring 114 into a space defined by air frame members 148 which mount the support frame to fire wall 149 of the aircraft.

The means for resiliently mounting the support frame to air frame members 148 include first and second, side mounting brackets 150,151 rigidly attached to opposite sides of ring member 114 and extending outwardly therefrom, and a third, top mounting bracket 152 projecting upwardly from the top of the ring member. Each such bracket is sandwiched between a pair of resilient mounting pads 154,155. A mounting plate 156 at the converging ends of each converging pair of air frame members 148 is connected to the ring member by a single bolt extending through the plate, bracket and pads in a manner similar to that described with reference to FIG. 8. The air frame members include an upper pair of such members 158,159 converging at upper mounting bracket 152 and two pairs of side air frame members 160,161, one pair on each of the opposite sides of the engine and converging at each of the side mounting brackets 150,151.

In the arrangement of FIG. 9, the overall length of the support frame is reduced as compared to that of FIG. 1. As a result, the overall weight of the assembly is reduced, and any change in the center of gravity of the aircraft because of the conversion is minimized.

Another advantage of the FIG. 9 embodiment over that of FIG. 1 is that the loads imposed on the three connections between the ring member and air frame members 48 by the cantilever mounting of the gearbox are greatly reduced because of the shorter cantilever mounting of the gearbox. Such loads are also more evenly balanced at these connections with both the engine and gearbox cantilever-mounted in opposite directions from the ring member.

A similar support frame and engine suspension system can be used to mount the engine in a right-side-up orientation. However, with such an arrangement, the overall length of the support frame would be increased because the longitudinal support frame members would need to be longer than shown in FIG. 9 to suspend the gearbox forwardly of the engine in the relationship shown in FIG. 1. However, with such arrangement, such frame members could still be shorter than those shown in FIG. 1 because of the fore and aft centered position of the engine within the ring member.

Having illustrated and described the principles of my invention with reference to what are presently preferred embodiments, and having suggested several alternative embodiments, it should be apparent to persons skilled in the art that the invention permits of modification in arrangement and detail without departing from such principles. I claim as my invention all such modifications as come within the true spirit and scope of the following claims.

I claim:

1. The method of mounting a turbine engine in a fixed-wing aircraft or the like for driving a propeller comprising the steps:

providing a unitary open rigid support frame having a frame ring and rigid support sturts rigidly connected to the ring and extending forwardly therefrom, detachably but rigidly connecting a gearbod for driving the propeller to the free ends of said struts, with the input shaft of the gearbox extending toward the ring, nonresiliently suspending the turbine engine from the frame ring inwardly of the ring and independently of the gearbox and in a position spaced from the gearbox with an output shaft of the engine axially aligned with, but spaced from an input shaft of the gearbox using inelastic suspension means which enable thermal expansion and contraction of the engine relative to the frame ring while restraining the engine against any substantial bodily movement relative to said ring, flexibly coupling the output shaft to the input shaft to drivingly interconnect the engine output shaft and the gearbox input shaft and to accommodate both slight axial misalignments and slight relative axial movement of said shafts, and resiliently connecting the frame ring to an airframe portion of the aircraft.

2. A gas turbine engine power plant assembly for installation as a unit in a fixed wing aircraft or the like comprising:

an open cage-like structural support frame, including a rigid frame ring, frame struts rigidly connected at one set of ends to said ring and extending forwardly therefrom, a gearbox having a rearwardly directed input shaft at the other forward set of ends of said frame struts, fastening means on said gearbox and forward set of ends for detachably but rigidly connecting said gearbox to said struts, a turboshaft gas turbine engine positioned within said frame and in inwardly spaced relation to said ring and in rearwardly spaced relation to said gearbox, said engine having a forwardly directed output shaft, inelastic engine suspension means interconnecting said ring and engine to inelastically suspend said engine within said frame with said output shaft aligned with said input shaft, said suspension means enabling the thermal expansion and contraction of said engine relative to said frame while restraining said engine against any substantial bodily movement relative to said frame, a drive shaft extending between said output and input shafts, and coupling means interconnecting the opposite ends of said drive shaft with the adjacent ends of said input and output shafts, said coupling means being both laterally and longitudinally flexible to accommodate the linear expansion and contracton of the drive train and slight axial misalignment of said shafts.

3. An assembly according to claim 2 wherein said engine suspension means comprises suspension struts extending rearwardly from said frame ring and detachably but rigidly connected at the free ends thereof to said engine, at least some of said struts accommodating thermal expansion and contraction of said engine through bending.

4. An assembly according to claim 2 wherein said engine suspension means comprises pin-and sleeve type rigid coupling means connecting said engine to said frame ring.

5. An assembly according to claim 3 wherein said suspension struts extend inwardly toward said engine from the plane of the frame ring at an angle of greater than 45° to facilitate flexing of said suspension struts upon the thermal expansion and contraction of said engine.

6. An assembly according to claim 2 wherein said frame ring includes frame mounting means integral with said ring for resiliently mounting said ring to the air frame structure.

* * * * *

UNITED STATES PATENT AND TRADEMARK OFFICE
CERTIFICATE OF CORRECTION

PATENT NO. : 4,531,694

DATED : July 30, 1985

INVENTOR(S) : JOE I. SOLOY

It is certified that error appears in the above-identified patent and that said Letters Patent is hereby corrected as shown below:

Under References Cited, FOREIGN PATENT DOCUMENTS, line 3, change "WO82/20695" to --WO82/02695--;

Column 1, line 5, change "INVETION" to --INVENTION--;

Column 10, line 11, change "sturts" to --struts--;

Column 10, line 14, change "gearbod" to --gearbox--;

Column 11, line 8, change "pin-and sleeve" to --pin-and-sleeve--.

Signed and Sealed this

Fifteenth Day of October 1985

[SEAL]

Attest:

Attesting Officer

DONALD J. QUIGG

Commissioner of Patents and Trademarks—Designate